(12) United States Patent
Suzuki et al.

(10) Patent No.: US 8,967,306 B2
(45) Date of Patent: Mar. 3, 2015

(54) VEHICLE DRIVING APPARATUS

(75) Inventors: Takabumi Suzuki, Wako (JP); Keiichi Ooiso, Wako (JP); Yoshio Akiba, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/009,990

(22) PCT Filed: Apr. 4, 2012

(86) PCT No.: PCT/JP2012/059259
§ 371 (c)(1),
(2), (4) Date: Oct. 4, 2013

(87) PCT Pub. No.: WO2012/137848
PCT Pub. Date: Oct. 11, 2012

(65) Prior Publication Data
US 2014/0033865 A1   Feb. 6, 2014

(30) Foreign Application Priority Data

Apr. 6, 2011  (JP) ................................. 2011-084621
Apr. 13, 2011  (JP) ................................. 2011-089247

(51) Int. Cl.
*H02K 5/20*   (2006.01)
*B60K 1/02*   (2006.01)
(Continued)

(52) U.S. Cl.
CPC .. *B60K 1/02* (2013.01); *H02K 5/20* (2013.01); *H02K 7/006* (2013.01); *B60K 1/00* (2013.01);
(Continued)

(58) Field of Classification Search
CPC ........... H02K 5/20; H02K 7/006; H02K 9/19; H02K 9/193; B60K 11/02; B60K 1/02; B60K 2006/266; F16H 57/0483; F16H 57/0476; F16H 57/045; F16H 57/0452; F16H 57/0447; F16H 57/0424; F16H 57/042; F16H 57/0409; F16H 57/04
USPC .................... 180/65.1, 65.6, 339; 310/54, 59; 475/159, 161; 184/6.2, 6.12; 192/85.61
See application file for complete search history.

(56) References Cited

U.S. PATENT DOCUMENTS

| 5,821,653 A * | 10/1998 | Kinto et al. .................... 310/89 |
| 2009/0107769 A1 * | 4/2009 | Sato et al. ..................... 184/6.2 |

(Continued)

FOREIGN PATENT DOCUMENTS

| JP | 5-122903 A | 5/1993 |
| JP | 5-262142 A | 10/1993 |

(Continued)

OTHER PUBLICATIONS

International search Report for PCT/JP2012/059259, Mailing Date of Jun. 26, 2012.

*Primary Examiner* — J. Allen Shriver, II
*Assistant Examiner* — Steve Clemmons
(74) *Attorney, Agent, or Firm* — Westerman, Hattori, Daniels & Adrian, LLP

(57) ABSTRACT

A rear wheel driving apparatus (1) includes: a first right-left communication passage (FP) through which a left reservoir (RL) and a right reservoir (RR) are communicated with each other; and a second right-left communication passage (SP) which is provided in parallel with the first right-left communication passage (FP) and through which the left reservoir (RL) and the right reservoir (RR) are communicated with each other. Thus, flowability of a liquid fluid stored in a case (11) is enhanced, and smoothing of a fluid level is enabled.

18 Claims, 12 Drawing Sheets

(51) Int. Cl.

| | | |
|---|---|---|
| *H02K 7/00* | (2006.01) | |
| *B60K 1/00* | (2006.01) | |
| *B60K 7/00* | (2006.01) | |
| *B60K 6/48* | (2007.10) | |
| *B60K 6/52* | (2007.10) | |
| *B60K 17/16* | (2006.01) | |
| *F16H 57/04* | (2010.01) | |
| *B60L 11/12* | (2006.01) | |
| *B60L 11/14* | (2006.01) | |
| *H02K 9/193* | (2006.01) | |
| *H02K 9/19* | (2006.01) | |

(52) U.S. Cl.
CPC ............... *B60K 7/0007* (2013.01); *B60K 6/48* (2013.01); *B60K 6/52* (2013.01); *B60K 17/20* (2013.01); *F16H 57/0445* (2013.01); *F16H 57/0476* (2013.01); *F16H 57/0483* (2013.01); *B60L 11/12* (2013.01); *B60L 11/14* (2013.01); *H02K 9/193* (2013.01); *H02K 9/19* (2013.01); *B60K 2001/006* (2013.01); *B60K 2007/0046* (2013.01); *B60K 2007/0092* (2013.01); *Y02T 10/6221* (2013.01); *Y02T 10/6265* (2013.01); *B60L 2220/46* (2013.01); *Y02T 10/7077* (2013.01); *Y02T 90/16* (2013.01); *Y02T 10/70* (2013.01); *Y02T 10/641* (2013.01)
USPC .......... 180/65.6; 180/65.1; 180/339; 310/59; 184/6.2

(56) References Cited

U.S. PATENT DOCUMENTS

| | | | |
|---|---|---|---|
| 2011/0050014 A1* | 3/2011 | Mogi | 310/83 |
| 2012/0091836 A1* | 4/2012 | Hayashi et al. | 310/54 |

FOREIGN PATENT DOCUMENTS

| | | | | |
|---|---|---|---|---|
| JP | 6-81929 | A | | 3/1994 |
| JP | 6-87336 | A | | 3/1994 |
| JP | 6-98417 | A | | 4/1994 |
| JP | 11-350956 | A | | 12/1999 |
| JP | 2003-169448 | A | | 6/2003 |
| JP | 2010-236674 | A | | 10/2010 |
| JP | 2010-247657 | A | | 11/2010 |
| JP | 2010-249220 | A | | 11/2010 |
| JP | 2010249220 | A | * | 11/2010 |
| JP | 2011031746 | A | * | 2/2011 |
| WO | 2010/010042 | A1 | | 1/2010 |
| WO | 2012/042983 | A1 | | 4/2012 |

* cited by examiner

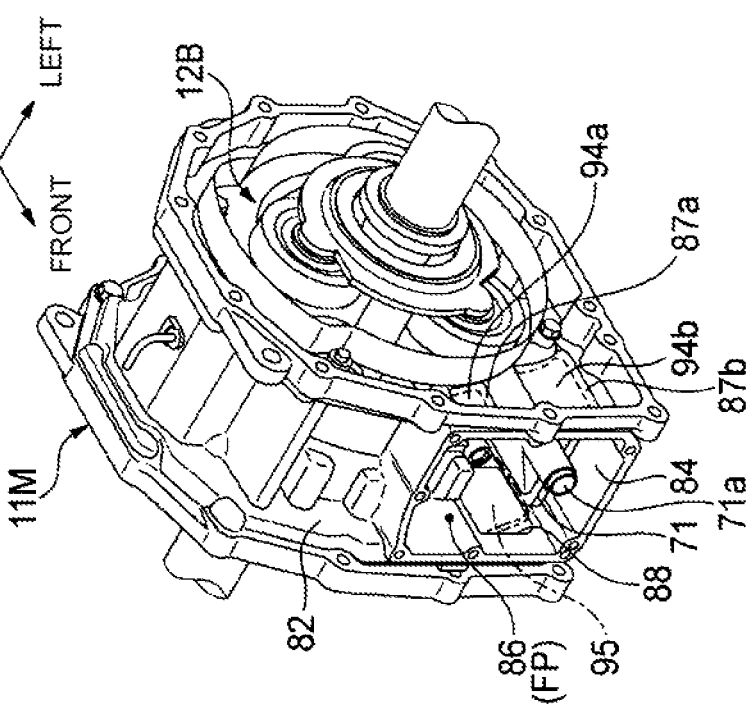
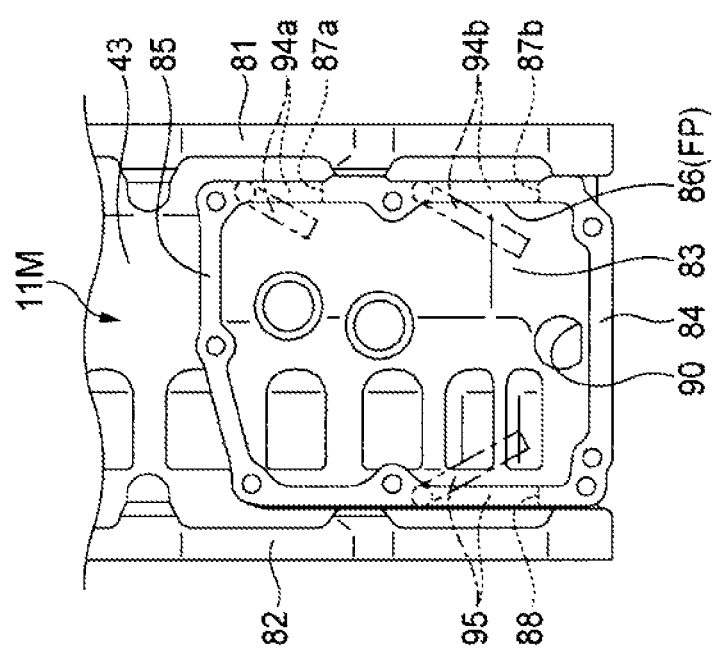
FIG. 12

(a)

(b)

VEHICLE DRIVING APPARATUS

TECHNICAL FIELD

The present invention relates to a vehicle driving apparatus including at least a pair of electric motors each of which drives an associated one of right and left wheels, and more specifically relates to a vehicle driving apparatus provided in consideration of flowability of a liquid fluid stored in each case that stores an associated one of electric motors.

BACKGROUND ART

A vehicle driving apparatus disclosed in Patent Document 1 includes a pair of electric motors each of which is capable of independently outputting a driving force to an associated one of right and left axles, and planetary gear type speed reducers are provided on a power transmission path between the axles and the electric motors. On the power transmission path, there are provided a one-way clutch for transmitting one-way rotational power of the electric motors to the axles, and a hydraulic brake for transmitting two-way rotational power of the electric motors to the axles by connection and disconnection between a rotation element of the planetary gear type speed reducer and a case.

PRIOR ART REFERENCE

Patent Document

Patent Document 1: JP-A-2010-236674

SUMMARY OF THE INVENTION

Problems to be Solved by the Invention

In the vehicle driving apparatus disclosed in Patent Document 1, oil for lubricating and cooling the pair of electric motors and the power transmission path is stored in the case; however, when the oil does not flow suitably, an oil level in the case becomes uneven, which unfavorably causes, for example, an increase in oil agitation resistance. For example, when a vehicle makes a turn, the oil is drawn toward one side in the case due to centrifugal force and the oil level at the one side is increased, which might increase, for example, oil agitation resistance depending on the amount of the stored oil. In Patent Document 1, oil that activates a piston of the hydraulic brake is mentioned, but there is no mention about the flowability of oil stored in the case.

The present invention has been made in view of the above-described problems, and its object is to provide a vehicle driving apparatus that enhances flowability of a liquid fluid stored in a case, thus enabling smoothing of a fluid level.

Solution to the Problems

To achieve the above object, the invention of Claim 1 provides a vehicle driving apparatus (e.g., a rear wheel driving apparatus 1 according to an after-mentioned embodiment) including:

a first electric motor (e.g., a first electric motor 2A according to the after-mentioned embodiment) for driving a left wheel (e.g., a left rear wheel LWr according to the after-mentioned embodiment);

a first case (e.g., a first case 11L according to the after-mentioned embodiment) that houses the first electric motor and includes a left reservoir (e.g., a left reservoir RL according to the after-mentioned embodiment) for storing a liquid fluid for lubrication and/or cooling of the first electric motor;

a second electric motor (e.g., a second electric motor 2B according to the after-mentioned embodiment) for driving a right wheel (e.g., a right rear wheel RWr according to the after-mentioned embodiment);

a second case (e.g., a second case 11R according to the after-mentioned embodiment) that houses the second electric motor and includes a right reservoir (e.g., a right reservoir RR according to the after-mentioned embodiment) for storing a liquid fluid for lubrication and/or cooling of the second electric motor;

a first right-left communication passage (e.g., a first right-left communication passage FP according to the after-mentioned embodiment) through which the right reservoir and the left reservoir are communicated with each other; and a second right-left communication passage (e.g. a second right-left communication passage SP according to the after-mentioned embodiment) which is provided in parallel with the first right-left communication passage and through which the right reservoir and the left reservoir are communicated with each other.

The invention of Claim 2 based on Claim 1 provides the vehicle driving apparatus, wherein the apparatus further includes a drainage passage (e.g., a drain passage 90 according to the after-mentioned embodiment) through which the first right-left communication passage and a drainage port (e.g., a drainage port 91 according to the after-mentioned embodiment) for discharging the liquid fluid to outside are communicated with each other, and wherein the second right-left communication passage intersects and communicates with the drainage passage.

The invention of Claim 3 based on Claim 1 or 2 provides the vehicle driving apparatus, wherein the first right-left communication passage includes a center volume chamber (e.g., a strainer containing chamber 86 according to the after-mentioned embodiment) provided with a suction port of a liquid fluid supply device (e.g., a suction port of a strainer 71 according to the after-mentioned embodiment) for supplying the liquid fluid, wherein the left reservoir and the center volume chamber are communicated with each other via a left middle communication passage (e.g., through holes 87a and 87b according to the after-mentioned embodiment), and wherein the right reservoir and the center volume chamber are communicated with each other via a right middle communication passage (e.g., a through hole 88 according to the after-mentioned embodiment).

The invention of Claim 4 based on Claim 3 provides the vehicle driving apparatus, wherein a bottom (e.g., a bottom SPa according to the after-mentioned embodiment) of the second right-left communication passage is located lower than at least one of a bottom (e.g., a bottom 87ba according to the after-mentioned embodiment) of the left middle communication passage and a bottom (e.g., a bottom 88a according to the after-mentioned embodiment) of the right middle communication passage.

The invention of Claim 5 based on Claim 1 provides the vehicle driving apparatus (e.g., the rear wheel driving apparatus 1 according to the after-mentioned embodiment) including:

a drainage passage (e.g., the drain passage 90 according to the after-mentioned embodiment) that communicates with the second right-left communication passage and includes a drainage port (e.g., the drainage port 91 according to the after-mentioned embodiment) through which the liquid fluid is discharged to outside; and a plug member (e.g., a drain bolt 92A according to the after-mentioned embodiment) for closing the drainage port, wherein the plug member is so long as to protrude into the second right-left communication passage via the drainage passage, with the drainage port closed by the plug member.

The invention of Claim 6 based on Claim 5 provides the vehicle driving apparatus, wherein the second right-left communication passage intersects and communicates with the drainage passage, and wherein the plug member is so long as to close an entire intersection region where the plug member intersects the second right-left communication passage via the drainage passage, with the drainage port closed by the plug member.

The invention of Claim 7 based on Claim 5 or 6 provides the vehicle driving apparatus, wherein the first right-left communication passage includes a center volume chamber (e.g., the strainer containing chamber 86 according to the after-mentioned embodiment) provided with a suction port of a liquid fluid supply device (e.g., the suction port of the strainer 71 according to the after-mentioned embodiment) used for supply of the liquid fluid, wherein the left reservoir and the center volume chamber are communicated with each other via a left middle communication passage (e.g., the through holes 87a and 87b according to the after-mentioned embodiment), and wherein the right reservoir and the center volume chamber are communicated with each other via a right middle communication passage (e.g., the through hole 88 according to the after-mentioned embodiment).

The invention of Claim 8 based on Claim 7 provides the vehicle driving apparatus, wherein a strainer (e.g., the strainer 71 according to the after-mentioned embodiment) for filtering the liquid fluid sucked through the suction port is disposed in the center volume chamber.

The invention of Claim 9 based on Claim 7 or 8 provides the vehicle driving apparatus, wherein the left middle communication passage is provided with a first one-way flow suppressing means (e.g., first inner doors 94a and 94b according to the after-mentioned embodiment) that suppresses a flow of the liquid fluid to the left reservoir from the center volume chamber and allows the liquid fluid to flow to the center volume chamber from the left reservoir, and wherein the right middle communication passage is provided with a second one-way flow suppressing means (e.g., a second inner door 95 according to the after-mentioned embodiment) that suppresses a flow of the liquid fluid to the right reservoir from the center volume chamber and allows a flow of the liquid fluid to the center volume chamber from the right reservoir.

The invention of Claim 10 provides a vehicle driving apparatus including:

a first electric motor (e.g., the first electric motor 2A according to the after-mentioned embodiment) for driving a left wheel (e.g. the left rear wheel LWr according to the after-mentioned embodiment);

a first speed changer (e.g., a first planetary gear type speed reducer 12A according to the after-mentioned embodiment) provided on a power transmission path between the first electric motor and the left wheel;

a first case (e.g., the first case 11L according to the after-mentioned embodiment) that houses the first electric motor and the first speed changer, and includes a left reservoir (e.g., the left reservoir RL according to the after-mentioned embodiment) for storing a liquid fluid for lubrication and/or cooling of at least one of the first electric motor and the power transmission path;

a second electric motor (e.g., the second electric motor 2B according to the after-mentioned embodiment) for driving a right wheel (e.g., the right rear wheel RWr according to the after-mentioned embodiment);

a second speed changer (e.g. a second planetary gear type speed reducer 12B according to the after-mentioned embodiment) provided on a power transmission path between the second electric motor and the right wheel;

a second case (e.g., the second case 11R according to the after-mentioned embodiment) that houses the second electric motor and the second speed changer, and includes a right reservoir (e.g., the right reservoir RR according to the after-mentioned embodiment) for storing a liquid fluid for lubrication and/or cooling of at least one of the second electric motor and the power transmission path;

a first right-left communication passage (e.g., the first right-left communication passage FP according to the after-mentioned embodiment) through which the right reservoir and the left reservoir are communicated with each other; and a second right-left communication passage (e.g., the second right-left communication passage SP according to the after-mentioned embodiment) which is provided in parallel with the first right-left communication passage and through which the right reservoir and the left reservoir are communicated with each other.

The invention of Claim 11 based on Claim 10 provides the vehicle driving apparatus, wherein the apparatus further includes a drainage passage through which the first right-left communication passage and a drainage port for discharging the liquid fluid to outside are communicated with each other, and wherein the second right-left communication passage intersects and communicates with the drainage passage.

The invention of Claim 12 based on Claim 10 or 11 provides the vehicle driving apparatus, wherein the first right-left communication passage includes a center volume chamber provided with a suction port of a liquid fluid supply device for supplying the liquid fluid, wherein the left reservoir and the center volume chamber are communicated with each other via a left middle communication passage, and wherein the right reservoir and the center volume chamber are communicated with each other via a right middle communication passage.

The invention of Claim 13 based on Claim 12 provides the vehicle driving apparatus, wherein a bottom of the second right-left communication passage is located lower than at least one of a bottom of the left middle communication passage and a bottom of the right middle communication passage.

The invention of Claim 14 based on Claim 10 provides the vehicle driving apparatus (e.g., the rear wheel driving apparatus 1 according to the after-mentioned embodiment) including:

a drainage passage (e.g., the drain passage 90 according to the after-mentioned embodiment) that communicates with the second right-left communication passage and includes a drainage port (e.g., the drainage port 91 according to the after-mentioned embodiment) through which the liquid fluid is discharged to outside; and a plug member (e.g., the drain bolt 92A according to the after-mentioned embodiment) for closing the drainage port, wherein the plug member is so long as to protrude into the second right-left communication passage via the drainage passage, with the drainage port closed by the plug member.

The invention of Claim 15 based on Claim 14 provides the vehicle driving apparatus, wherein the second right-left communication passage intersects and communicates with the drainage passage, and wherein the plug member is so long as to close an entire intersection region where the plug member intersects the second right-left communication passage via the drainage passage, with the drainage port closed by the plug member.

The invention of Claim 16 based on Claim 14 or 15 provides the vehicle driving apparatus, wherein the first right-left communication passage includes a center volume chamber provided with a suction port of a liquid fluid supply device used for supply of the liquid fluid, wherein the left reservoir and the center volume chamber are communicated with each other via a left middle communication passage, and wherein the right reservoir and the center volume chamber are communicated with each other via a right middle communication passage.

The invention of Claim 17 based on Claim 16 provides the vehicle driving apparatus, wherein a strainer for filtering the liquid fluid sucked through the suction port is disposed in the center volume chamber.

The invention of Claim 18 based on Claim 16 or 17 provides the vehicle driving apparatus, wherein the left middle communication passage is provided with a first one-way flow suppressing means that suppresses a flow of the liquid fluid to the left reservoir from the center volume chamber and allows the liquid fluid to flow to the center volume chamber from the left reservoir, and wherein the right middle communication passage is provided with a second one-way flow suppressing means that suppresses a flow of the liquid fluid to the right reservoir from the center volume chamber and allows the liquid fluid to flow to the center volume chamber from the right reservoir.

Effects of the Invention

According to the invention of Claim 1, flowability of the liquid fluid in the right reservoir and the left reservoir is enhanced by the first and second right-left communication passages, thus enabling smoothing of a fluid level.

According to the invention of Claim 2, in addition to the first right-left communication passage, a path leading to the drainage port from the second right-left communication passage is also provided, thus improving drainage ability. In particular, a distance of the second right-left communication passage to the drainage port is short, and therefore, drainage ability can be further improved.

According to the invention of Claim 3, the suction port of the liquid fluid supply device is disposed in the first right-left communication passage in which a liquid level is stable compared with that in the right reservoir and the left reservoir, and therefore, the amount of air sucked into the liquid fluid supply device can be reduced. Since the center volume chamber is defined in the first right-left communication passage, the amount of suction air can be further reduced.

According to the invention of Claim 4, a liquid fluid unable to flow beyond the right middle communication passage and the left middle communication passage can be discharged through the second right-left communication passage.

According to the invention of Claim 5, the plug member is so long as to protrude into the second right-left communication passage; thus, the second right-left communication passage can be at least partially closed, and the flowability of the liquid fluid stored in the case can be reduced, so that a flow of the liquid fluid toward one side in the case can be suppressed. Accordingly, it is possible to achieve both of favorable drainage upon removal of the plug member, and reduction in flowability of the liquid fluid upon insertion of the plug member. In particular, the communication of the drainage passage with the second right-left communication passage allows the liquid fluid to be favorably discharged from the right and left reservoirs through the single drainage passage.

According to the invention of Claim 6, the entire second right-left communication passage can be closed by the plug member, and thus the flowability of the liquid fluid stored in the case can be further reduced.

According to the invention of Claim 7, the suction port of the liquid fluid supply device is disposed in the first right-left communication passage in which the liquid level is stable compared with that in the right reservoir and the left reservoir, and therefore, the liquid fluid can be reliably supplied to the liquid fluid supply device, furthermore, the amount of air sucked into the liquid fluid supply device can be reduced. Since the center volume chamber is defined in the first right-left communication passage, the amount of suction air can be further reduced.

According to the invention of Claim 8, the strainer disposed in the center volume chamber serves as an obstruction to enable a reduction in flowability of the liquid fluid in the first right-left communication passage, thus making it possible to suppress the flow of the liquid fluid toward one side in the case. Compared with a case where the strainer is disposed outside of the center volume chamber, the driving apparatus can be reduced in size.

According to the invention of Claim 9, when a vehicle makes a turn, for example, the first and second one-way flow suppressing means can reduce the flow of the liquid fluid from the inside of the first right-left communication passage to the right reservoir or the left reservoir, thus suppressing the flow of the liquid fluid toward one side in the case.

According to the invention of Claim 10, even when the vehicle driving apparatus is adapted to include the first and second speed changers, the flowability of the liquid fluid in the right reservoir and the left reservoir is enhanced by the first and second right-left communication passages, thus enabling smoothing of the fluid level.

According to the invention of Claim 11, in addition to the first right-left communication passage, a path leading to the drainage port from the second right-left communication passage is also provided, thus improving drainage ability. In particular, the distance of the second right-left communication passage to the drainage port is short, and therefore, drainage ability can be further improved.

According to the invention of Claim 12, the suction port of the liquid fluid supply device is disposed in the first right-left communication passage in which the liquid level is stable compared with that in the right reservoir and the left reservoir, and therefore, the amount of air sucked into the liquid fluid supply device can be reduced. Since the center volume chamber is defined in the first right-left communication passage, the amount of suction air can be further reduced.

According to the invention of Claim 13, the liquid fluid unable to flow beyond the right middle communication passage and the left middle communication passage can be discharged through the second right-left communication passage.

According to the invention of Claim 14, even when the vehicle driving apparatus is adapted to include the first and second speed changers, the plug member is so long as to protrude into the second right-left communication passage; thus, the second right-left communication passage can be at least partially closed, and the flowability of the liquid fluid stored in the case can be reduced, so that the flow of the liquid fluid toward one side in the case can be suppressed. Accordingly, it is possible to achieve both of favorable drainage upon removal of the plug member, and reduction in flowability of the liquid fluid upon insertion of the plug member. In particular, the communication of the drainage passage with the second right-left communication passage allows the liquid fluid to be favorably discharged from the right and left reservoirs through the single drainage passage.

According to the invention of Claim 15, the entire second right-left communication passage can be closed by the plug member, and thus the flowability of the liquid fluid stored in the case can be further reduced.

According to the invention of Claim 16, the suction port of the liquid fluid supply device is disposed in the first right-left communication passage in which the liquid level is stable compared with that in the right reservoir and the left reservoir, and therefore, the liquid fluid can be reliably supplied to the liquid fluid supply device; furthermore, the amount of air sucked into the liquid fluid supply device can be reduced. Since the center volume chamber is defined in the first right-left communication passage, the amount of suction air can be further reduced.

According to the invention of Claim 17, the strainer disposed in the center volume chamber serves as an obstruction to enable a reduction in flowability of the liquid fluid in the first right-left communication passage, thus making it possible to suppress the flow of the liquid fluid toward one side in the case. Compared with the case where the strainer is disposed outside of the center volume chamber, the driving apparatus can be reduced in size.

According to the invention of Claim 18, when the vehicle makes a turn, for example, the first and second one-way flow suppressing means can reduce the flow of the liquid fluid from the inside of the first right-left communication passage to the right reservoir or the left reservoir, thus suppressing the flow of the liquid fluid toward one side in the case.

BRIEF DESCRIPTION OF THE DRAWINGS

FIG. 5(*b*) is a right perspective view of FIG. 5(*a*).

FIG. 5(*c*) is a left perspective view of FIG. 5(*a*).

FIG. 6(*b*) is a right side view of the center case.

FIG. 6(*c*) is a front view of the center case.

FIG. 6(*d*) is a left side view of the center case.

FIG. 12(*a*) is an enlarged front view illustrating a main portion of a center case of a rear wheel driving apparatus according to a third embodiment of the present invention.

FIG. 12(*b*) is a left perspective view illustrating a peripheral structure of the center case.

FIG. 13(*b*) is a cross-sectional view for a comparison between a fluid level in the present embodiment and a fluid level in a conventional technique.

MODE FOR CARRYING OUT THE INVENTION

Figure 1:
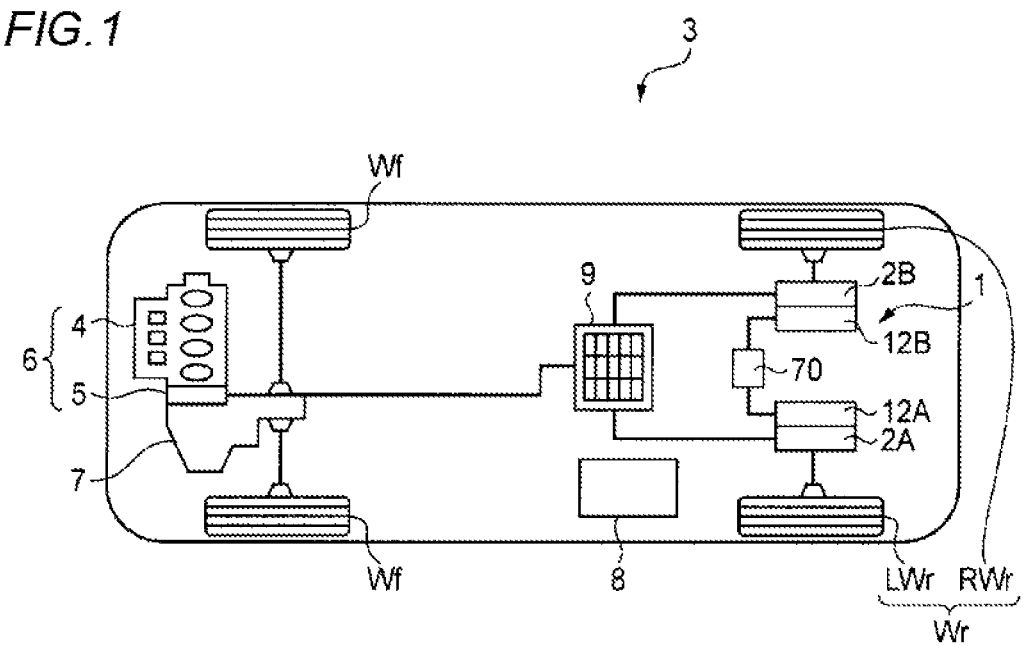
FIG. 1 is a block diagram illustrating a schematic configuration of a hybrid vehicle on which a vehicle driving apparatus according to a first embodiment of the present invention can be installed.

A vehicle driving apparatus according to the present invention utilizes an electric motor as a driving source for driving a wheel, and is used in a driving system illustrated in FIG. 1, for example. The following description is based on an example in which the vehicle driving apparatus is used to drive a rear wheel, but the vehicle driving apparatus may alternatively be used to drive a front wheel.

A vehicle 3 illustrated in FIG. 1 is a hybrid vehicle that includes, in a vehicle front portion, a driving apparatus 6 (hereinafter referred to as a "front wheel driving apparatus") in which an internal combustion engine 4 and an electric motor 5 are connected in series. Power generated by the front wheel driving apparatus 6 is transmitted to front wheels Wf via a transmission 7, while power generated by a driving apparatus 1 (hereinafter referred to as a "rear wheel driving apparatus") provided in a vehicle rear portion separately from the front wheel driving apparatus 6 is transmitted to rear wheels Wr (RWr and LWr). The electric motor 5 of the front wheel driving apparatus 6, and first and second electric motors 2A and 2B of the rear wheel driving apparatus 1 for the rear wheels Wr are connected to a battery 9, so that electric power supply from the battery 9 and energy regeneration to the battery 9 are enabled. The reference character "8" in FIG. 1 denotes a control device for controlling the entire vehicle.

First, the vehicle driving apparatus according to a first embodiment of the present invention will be described with reference to FIGS. 2 to 4.

Figure 2:
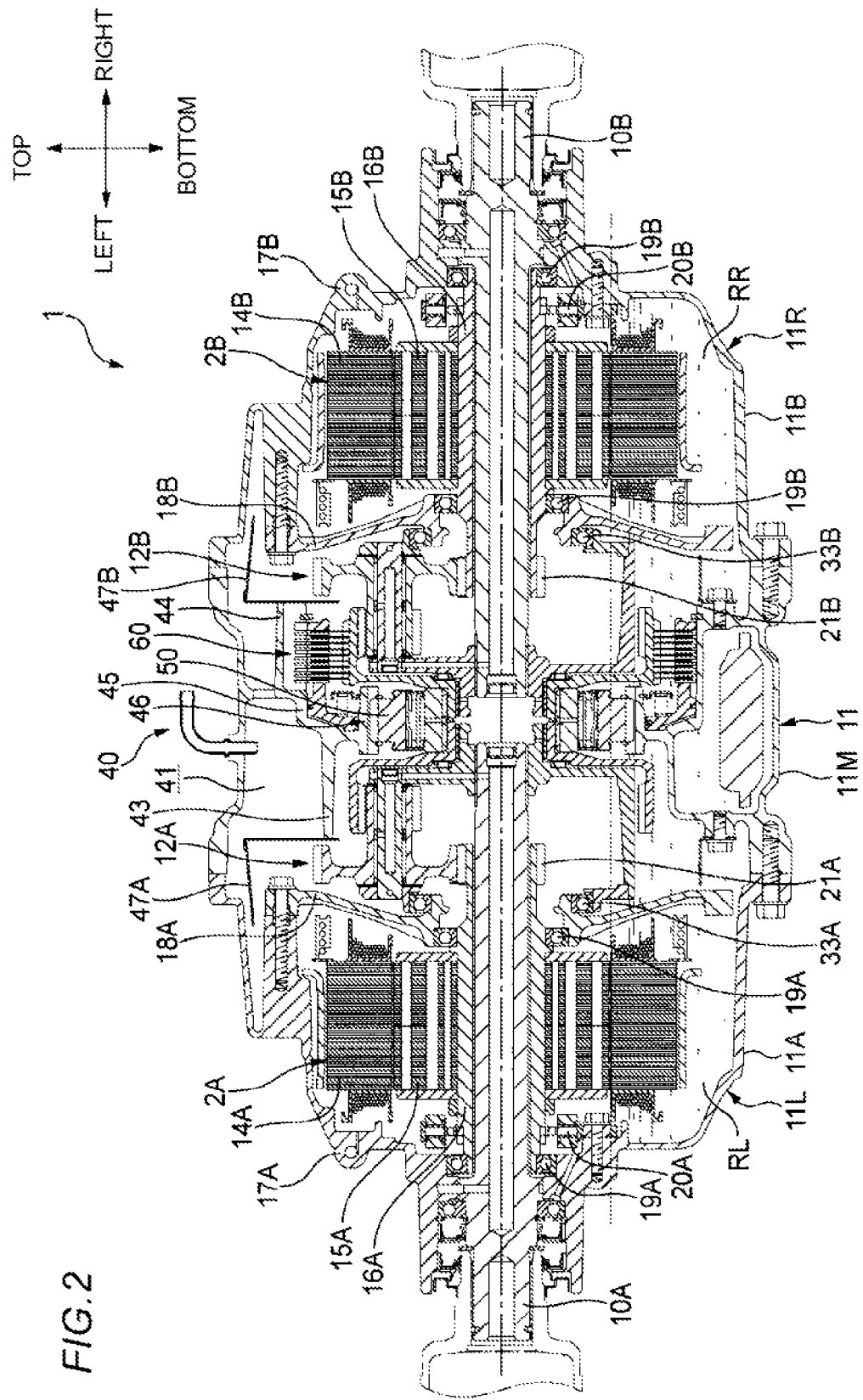
FIG. 2 is an overall cutaway cross-sectional view of a rear wheel driving apparatus according to the first embodiment taken along the line II-II of FIG. 5(*b*).
Figure 3:
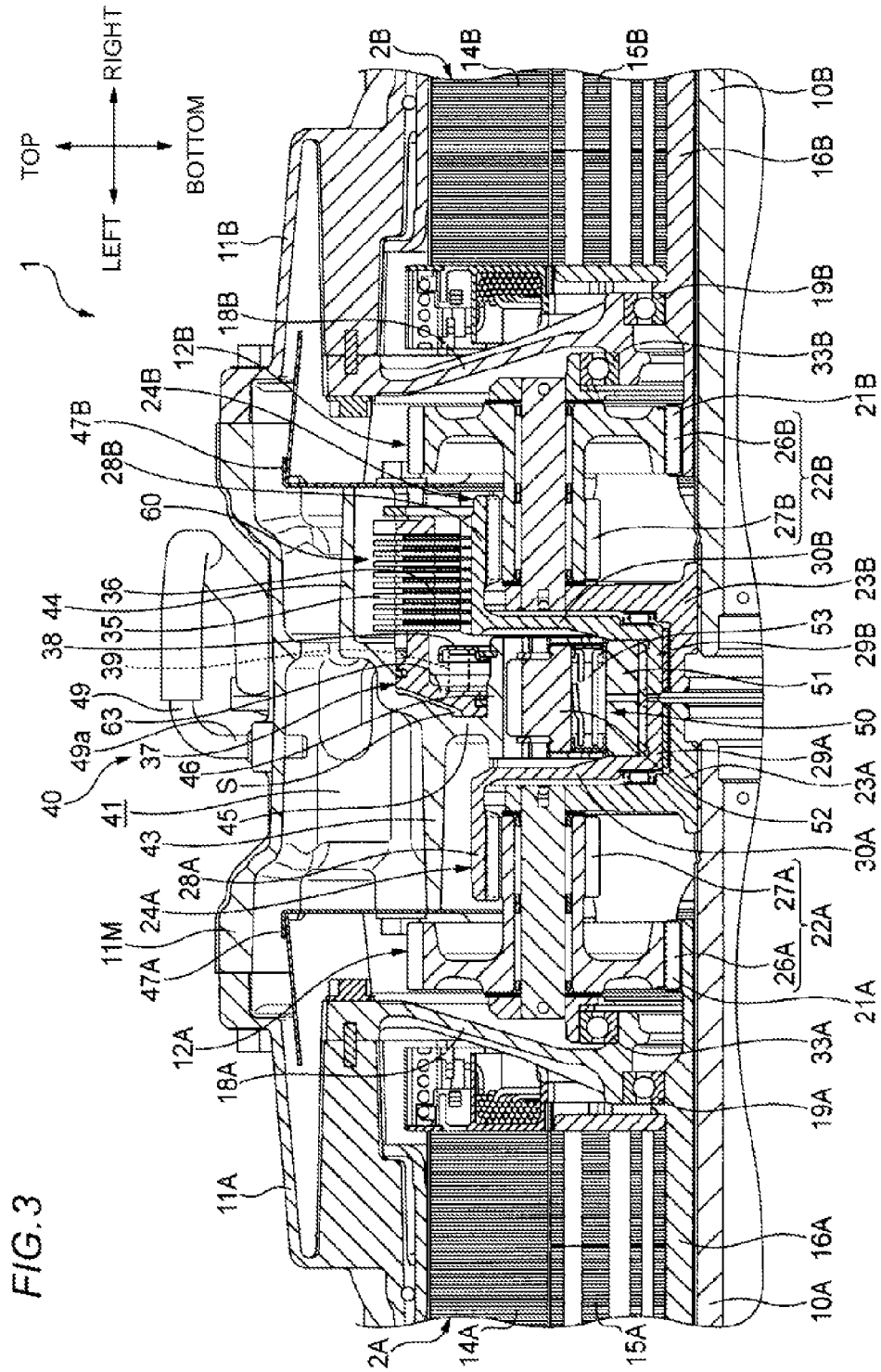
FIG. 3 is a partially enlarged view of the rear wheel driving apparatus illustrated in FIG. 2.
Figure 4:
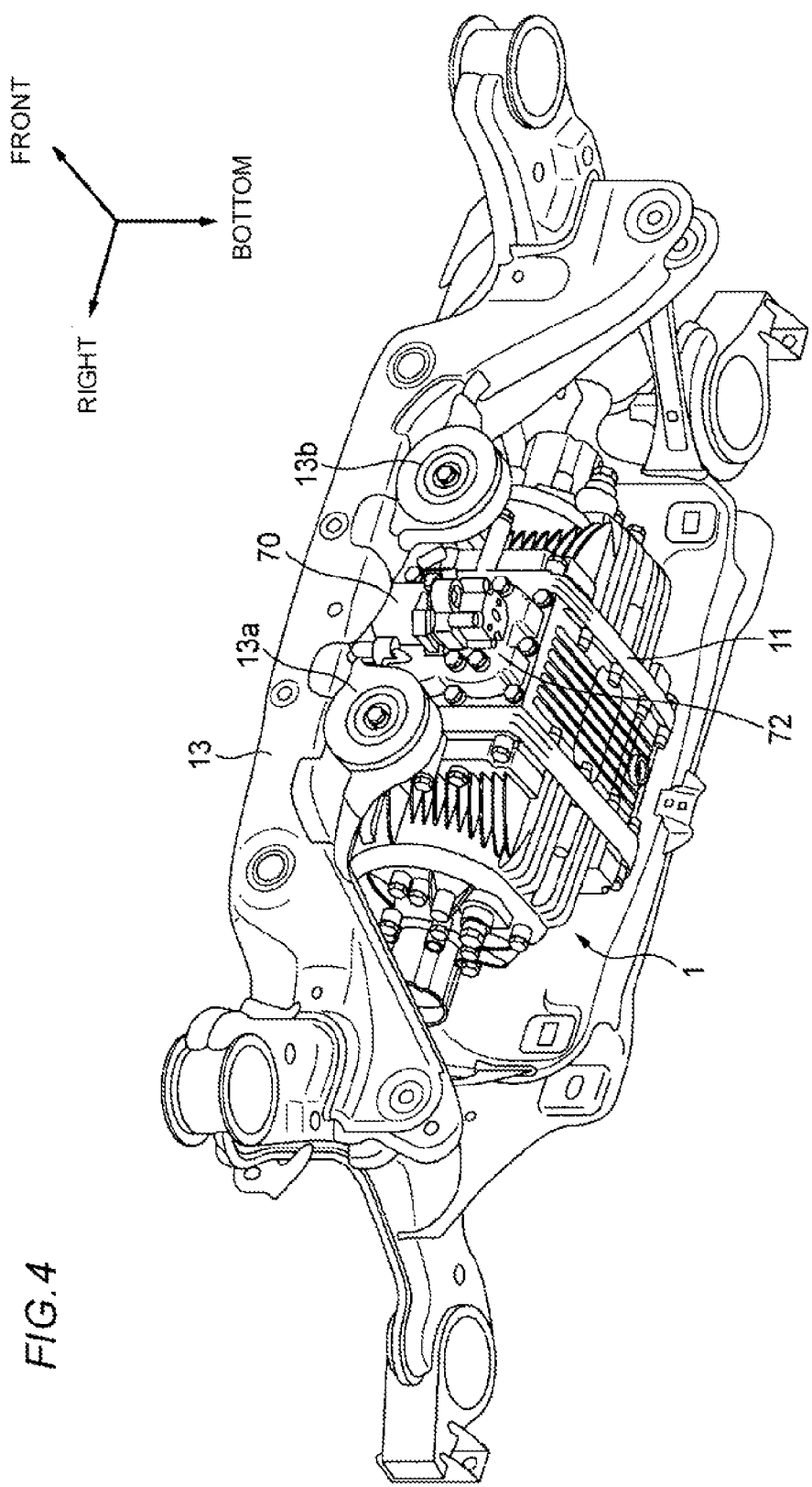
FIG. 4 is a perspective view illustrating the vehicle driving apparatus of FIG. 1 which is installed on a frame.
Figure 5:
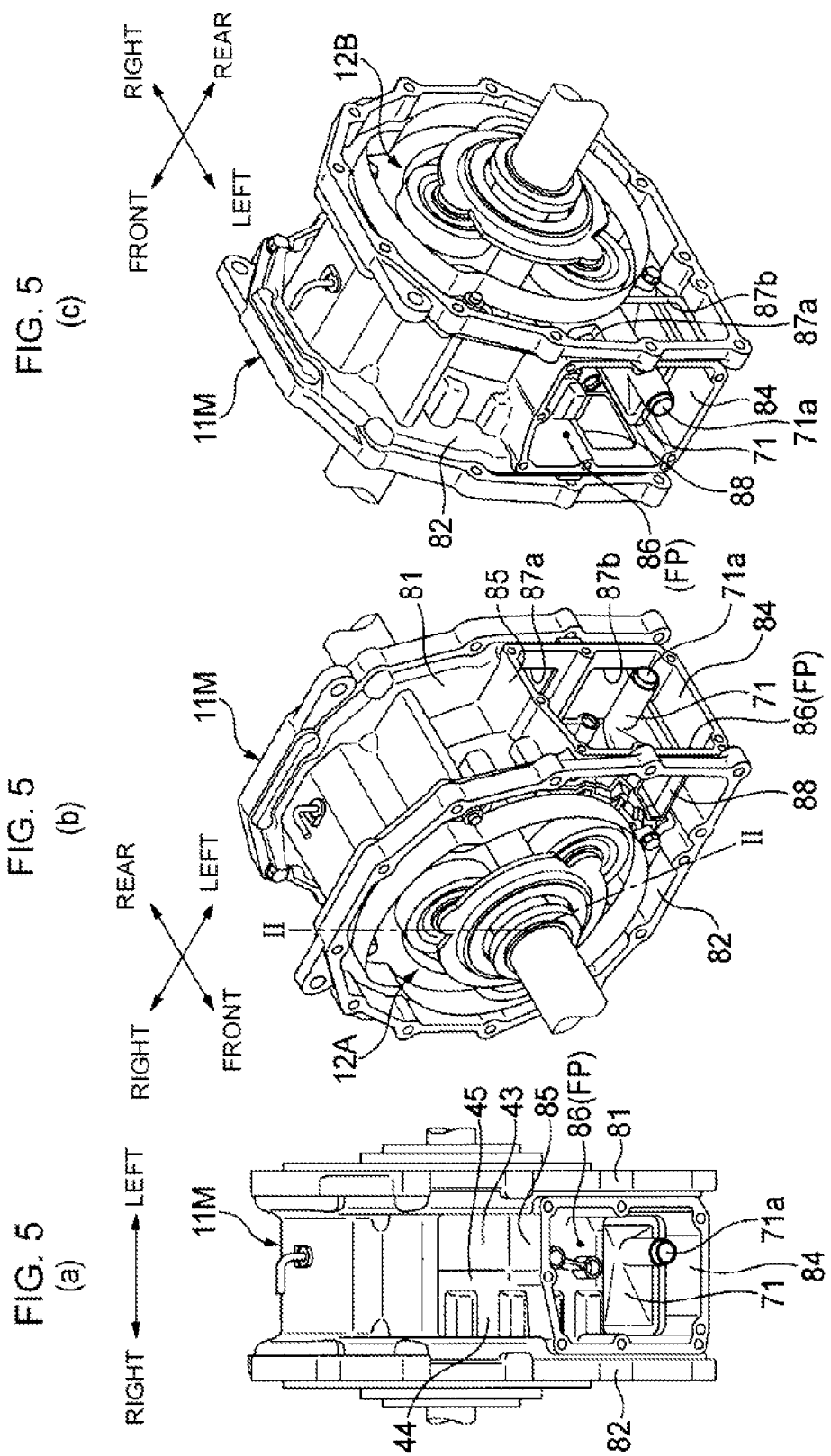
FIG. 5(*a*) is a front view illustrating a peripheral structure of a center case.

FIG. 2 is an overall longitudinal cross-sectional view of the rear wheel driving apparatus 1, and FIG. 3 is a partially enlarged view of FIG. 2. Referring to FIG. 2, the reference character "11" denotes a case of the rear wheel driving apparatus 1. The case 11 includes: a center case 11M disposed in a substantially widthwise center of the vehicle, and lateral cases 11A and 11B disposed leftward and rightward of the center case 11M, respectively, with the center case 11M sandwiched therebetween. The case 11 is formed into a substantially cylindrical shape as a whole. In the case 11, axles 10A and 10B for the rear wheels Wr, the first and second electric motors 2A and 2B for driving the axles, and first and second planetary gear type speed reducers 12A and 12B provided on a power transmission path between the electric motors 2A and 2B and the right and left rear wheels Wr and serving as first and second speed changers for reducing driving rotation of the electric motors 2A and 2B are disposed on the same axis. The axle 10A, the first electric motor 2A and the first planetary gear type speed reducer 12A drive and control the left rear wheel LWr. The axle 10B, the second electric motor 2B and the second planetary gear type speed reducer 12B drive and control the right rear wheel RWr. The axle 10A, first electric motor 2A and first planetary gear type speed reducer 12A, and the axle 10B, second electric motor 2B and second planetary gear type speed reducer 12B are disposed symmetrically in a vehicle width direction in the case 11.

Partition walls 18A and 18B are provided at portions of the lateral cases 11A and 11B adjacent to the center case 11M, respectively, so as to extend radially inward. The first electric motor 2A is disposed between the lateral case 11A and the partition wall 18A, and the second electric motor 2B is disposed between the lateral case 11B and the partition wall 18B. The first and second planetary gear type speed reducers 12A and 12B are disposed in a space surrounded by the center case 11M and the partition walls 18A and 18B. Note that arrows in FIGS. 2 to 9 represent positional relationships established when the rear wheel driving apparatus 1 is installed on the vehicle.

The rear wheel driving apparatus 1 is provided with a breather 40 through which inside and outside of the case 11 are communicated with each other, and inside air is allowed to escape to the outside via a breather chamber 41 so that the inside air does not excessively increase in temperature and pressure. The breather chamber 41 is disposed at a vertically upper position in the case 11, and includes a space defined by: an outer wall of the center case 114M a first cylindrical wall 43 provided inside the center case 11M so as to be extended substantially horizontally toward the lateral case 11A; a second cylindrical wall 44 extended substantially horizontally toward the lateral case 11B; a right-left partition wall 45 through which inner ends of the first and second cylindrical walls 43 and 44 are connected to each other; a baffle plate 47A attached so as to be abutted against a tip portion of the first cylindrical wall 43 located toward the lateral case 11A; and a baffle plate 47B attached so as to be abutted against a tip portion of the second cylindrical wall 44 located toward the lateral case 11B.

The first and second cylindrical walls 43 and 44 and the right-left partition wall 45 which constitute a lower surface of the breather chamber 41 are arranged as follows. The first cylindrical wall 43 is located radially inward of the second cylindrical wall 44. The right-left partition wall 45 is extended from the inner end of the second cylindrical wall 44 to the inner end of the first cylindrical wall 43 while being reduced in diameter and bent, and is further extended radially inward to reach a third cylindrical wall 46 that is extended substantially horizontally. The third cylindrical wall 46 is located inward of outer ends of the first and second cylindrical walls 43 and 44 and located at a substantially center region thereof.

In the center case 11M, an external communication passage 49 through which the breather chamber 41 and the outside are communicated with each other is connected to a vertical upper surface of the breather chamber 41. An end 49a of the external communication passage 49 adjacent to the breather chamber is disposed so as to face vertically downward. Accordingly, discharge of oil to the outside through the external communication passage 49 is suppressed.

In the first and second electric motors 2A and 2B, stators 14A and 14B are fixed to the lateral cases 11A and 11B, respectively, and annular rotors 15A and 15B are rotatably disposed inward of the stators 14A and 14B, respectively. Cylindrical shafts 16A and 16B surrounding outer peripheries of the axles 10A and 10B are connected to inner peripheral portions of the rotors 15A and 15B, respectively. The cylindrical shafts 16A and 16B are supported by end walls 17A and 17B of the lateral cases 11A and 11B and the partition walls 18A and 18B via bearings 19A and 19B so that the cylindrical shafts 16A and 16B can rotate coaxially with respect to the axles 10A and 10B, respectively. The end walls 17A and 17B located at outer peripheries of ends of the cylindrical shafts 16A and 16B are provided with resolvers 20A and 20B for feeding rotational position information of the rotors 15A and 15B back to a controller (not illustrated) of the electric motors 2A and 2B.

The first and second planetary gear type speed reducers 12A and 12B include sun gears 21A and 21B, a plurality of planetary gears 22A and 22B that intermesh with the sun gears 21, planetary carriers 23A and 23B for supporting the planetary gears 22A and 22B, respectively, and ring gears 24A and 24B that intermesh with outer peripheral portions of the planetary gears 22A and 22B, respectively, so that driving forces generated by the electric motors 2A and 2B are inputted from the sun gears 21A and 21B, respectively, and reduced driving forces are outputted through the planetary carriers 23A and 23B.

The sun gears 21A and 21B are formed integrally with the cylindrical shafts 16A and 16B, respectively. The planetary gears 22A and 22B are double pinions including large-diameter first pinions 26A and 26B that directly intermesh with the sun gears 21A and 21B, and second pinions 27A and 27B whose diameters are smaller than those of the first pinions 26A and 26B, and are integrally formed in a state where the first pinions 26A and 26B and the second pinions 27A and 27B are coaxially and axially offset. The planetary gears 22A and 22B are supported by the planetary carriers 23A and 23B, respectively. Axial inner ends of the planetary carriers 23A and 23B are extended radially inward and spline-fitted to the axles 10A and 10B; thus, the planetary carriers 23A and 23B are supported by the axles 10A and 10B so as to be rotatable together therewith. In addition, the planetary carriers 23A and 23B are supported by the partition walls 18A and 18B via bearings 33A and 33B, respectively.

The ring gears 24A and 24B include: gear portions 28A and 28B whose inner peripheral surfaces intermesh with the small-diameter second pinions 27A and 27B, respectively; small-diameter portions 29A and 29B having diameters smaller than those of the gear portions 28A and 28B and disposed to face each other at intermediate positions in the case 11; and connection portions 30A and 30B through which axial inner ends of the gear portions 28A and 28B and axial outer ends of the small-diameter portions 29A and 29B are radially connected to each other. In this embodiment, settings are made so that distances of radial outer edges of the ring gears 24A and 24B from centers of the axles 10A and 10B are smaller than maximum distances of the first pinions 26A and 26B from the centers of the axles 10A and 10B.

The gear portions 28A and 28B axially face each other, with the third cylindrical wall 46 at an inner-diameter end of the right-left partition wall 45 of the center case 11M sandwiched therebetween. Outer peripheral surfaces of the small-diameter portions 29A and 29B are spline-fitted to an inner race 51 of a one-way clutch 50 which will be described later, and the ring gears 24A and 24B are connected to each other so as to be rotated together with the inner race 51 of the one-way clutch 50.

A space is ensured between the second cylindrical wall 44 of the center case 11M of the case 11 and the gear portion 28B of the ring gear 24B. In this space, a hydraulic brake 60 constituting a braking means for the ring gear 24B is disposed so as to be radially overlapped with the first pinion 26B, and axially overlapped with the second pinion 27B. In the hydraulic brake 60, a plurality of fixation plates 35 spline-fitted to an inner peripheral surface of the second cylindrical wall 44, and a plurality of rotation plates 36 spline-fitted to an outer peripheral surface of the gear portion 28B of the ring gear 24B are axially alternately arranged, and the plates 35 and 36 are engaged and disengaged by an annular piston 37. The piston 37 is contained in an annular cylinder chamber provided between the right-left partition wall 45 of the center case 11M and the third cylindrical wall 46, and is movable forward and backward therein; moreover, at normal times, an elastic member 39 supported by a receiving seat 38 provided at an outer peripheral surface of the third cylindrical wall 46 urges the piston 37 in a direction in which the fixation plates 35 and the rotation plates 36 are disengaged.

More specifically, a space between the right-left partition wall 45 and the piston 37 is defined as an operation chamber S into which oil is directly introduced. When the pressure of the oil introduced into the operation chamber S exceeds the urging force of the elastic member 39, the piston 37 moves forward (rightward), and thus the fixation plates 35 and the rotation plates 36 are pressed against each other and engaged with each other. Conversely, when the urging force of the elastic member 39 exceeds the pressure of the oil introduced into the operation chamber S, the piston 37 moves backward (leftward), and thus the fixation plates 35 and the rotation plates 36 are separated from each other and disengaged from each other. Note that the hydraulic brake 60 is connected to an electric oil pump 70 (see FIG. 4) serving as a liquid fluid supply device.

In this hydraulic brake 60, the fixation plates 35 are supported by the second cylindrical wall 44 extending from the right-left partition wall 45 of the center case 11M of the case 11, while the rotation plates 36 are supported by the gear portion 28B of the ring gear 24B; therefore, when the plates 35 and 36 are pressed against each other by the piston 37, frictional engagement between the plates 35 and 36 exerts a braking force on the ring gear 24B to cause fixation thereof. When the engagement of the plates 35 and 36 by the piston 37 is released from this state, the ring gear 24B is allowed to rotate freely. Note that the ring gears 24A and 24B are connected to each other as mentioned above; therefore, when the hydraulic brake 60 is engaged, a braking force is also exerted on the ring gear 24A to cause fixation thereof and when the hydraulic brake 60 is disengaged, the ring gear 24A is also allowed to rotate freely.

A space is also ensured between the connection portions 30A and 30B of the ring gears 24A and 24B axially facing each other. In this space, the one-way clutch 50 that transmits power to the ring gears 24A and 24B only in one direction and prevents power from being transmitted thereto in the other direction is disposed. In the one-way clutch 50, a plurality of sprags 53 are interposed between the inner race 51 and outer race 52, and the inner race 51 is adapted so as to be rotated together with the small-diameter portions 29A and 29B of the ring gears 24A and 24B since the inner race 51 is spline-fitted thereto. The third cylindrical wall 46 determines positioning of the outer race 52 and prevents rotation thereof.

The one-way clutch 50 is adapted so as to lock the rotation of the ring gears 24A and 24B by being engaged when the vehicle 3 moves forward by power generated by the electric motors 2A and 2B. More specifically, the one-way clutch 50 enters an engaged state when rotational power is inputted to the wheels Wr from the electric motors 2A and 2B in a forward direction (i.e., a rotational direction when the vehicle 3 is moved forward), and enters a non-engaged state when rotational power is inputted to the wheels Wr from the electric motors 2A and 2B in the opposite direction; furthermore, the one-way clutch 50 enters the non-engaged state when rotational power is inputted to the electric motors 2A and 2B from the wheels Wr in the forward direction, and enters the engaged state when rotational power is inputted to the electric motors 2A and 2B from the wheels Wr in the opposite direction.

As described above, in the rear wheel driving apparatus 1 according to the present embodiment, the one-way clutch 50 and the hydraulic brake 60 are provided in parallel on the power transmission path between the electric motors 2A and 2B and the wheels Wr. Note that the hydraulic brake 60 is controlled to enter a disengaged state, a slightly engaged state or an engaged state by the pressure of oil supplied from the oil pump 70 in accordance with a running state of the vehicle or the engaged or non-engaged state of the one-way clutch 50. For example, when the vehicle 3 moves forward by power driving of the electric motors 2A and 2B (i.e., when the vehicle runs at a low or intermediate speed), the one-way clutch 50 is engaged, thus bringing about a power transmittable state, however, even when the input of the forward rotational power from the electric motors 2A and 2B is temporarily decreased to cause the one-way clutch 50 to enter the non-engaged state, the hydraulic brake 60 is controlled to enter the slightly engaged state, thereby preventing the electric motors 2A and 2B and the wheels Wr from entering a state in which power cannot be transmitted therebetween. When the vehicle 3 moves forward by power driving of the internal combustion engine 4 and/or the electric motor 5 (i.e., when the vehicle runs at a high speed), the one-way clutch 50 enters the non-engaged state, and furthermore, the hydraulic brake is controlled to enter the disengaged state, thus preventing excessive rotation of the electric motors 2A and 2B. When the vehicle 3 moves backward or regeneration is performed, the one-way clutch 50 enters the non-engaged state, and therefore, the hydraulic brake 60 is controlled to enter the engaged state; thus, rotational power is outputted to the wheels Wr from the electric motors 2A and 2B in the opposite direction, or rotational power is inputted to the electric motors 2A and 2B from the wheels Wr in the forward direction.

As illustrated in FIG. 2, in the present embodiment, the left lateral case 11A and the center case 11M constitute a first case 11L of the present invention for containing the first electric motor 2A and the first planetary gear type speed reducer 12A, and the right lateral case 11B and the center case 11M constitute a second case 11R for containing the second electric motor 2B and the second planetary gear type speed reducer 12B. The first case 11L includes a left reservoir RL for storing oil serving as a liquid fluid for lubrication and/or cooling of at least one of the first electric motor 2A and the power transmission path, and the second case 11R includes a right reservoir RR for storing oil for lubrication and/or cooling of at least one of the second electric motor 2B and the power transmission path.

As illustrated in FIGS. 5 to 9, outer peripheral surfaces of the first and second cylindrical walls 43 and 44 and the right-left partition wall 45 of the center case 11M are exposed to the outside except at regions where the first and second cylindrical walls 43 and 44 and the right-left partition wall 45 define the breather chamber 41. The outer peripheral surfaces of the first and second cylindrical walls 43 and 44 and the right-left partition wall 45 are provided with a pair of projected portions 81 and 82 projected radially from axial ends thereof.

At a position located obliquely below the first and second cylindrical walls 43 and 44 and the right-left partition wall 45, a strainer containing chamber (center volume chamber) 86 for containing a strainer 71 serving as a liquid fluid supply device is defined by: the outer peripheral surfaces of the first and second cylindrical walls 43 and 44 and the right-left partition wall 45; a wall 83 formed below the outer peripheral surfaces, a bottom 84 extended forward from a position below the wall 83; an upper wall 85 extended forward from intermediate regions of the outer peripheral surfaces, and the pair of projected portions 81 and 82. A front opening of the strainer containing chamber 86 is closed by a lid member 72 (see FIG. 4) to which the electric oil pump 70 is attached, and a discharge port 71a of the strainer 71 is connected to the electric oil pump 70. Hence, oil sucked through a suction port (not illustrated) provided at a lower surface of the strainer 71 has foreign matter removed therefrom by the strainer 71 and is sent to the electric oil pump 70.

The projected portions 81 and 82 are provided in a pair to define the strainer containing chamber 86. The projected portion 81 is provided with through holes 87a and 87b serving as a left middle communication passage through which the left reservoir RL and the strainer containing chamber 86 are communicated with each other, and the projected portion 82 is provided with a through hole 88 serving as a right middle communication passage through which the right reservoir RR and the strainer containing chamber 86 are communicated with each other. Thus, the left reservoir RL and the right reservoir RR are communicated with each other via a first right-left communication passage FP defined by the strainer containing chamber 86.

The lower wall 83 is provided with a drain passage 90 serving as a drainage passage one end of which passes therethrough in a front-rear direction to face the strainer containing chamber 86, and the other end of the drain passage 90 located in a rearward position constitutes a drainage port 91 through which oil is discharged to the outside. The drainage port 91 is closed by a drain bolt 92, so that oil is discharged to the outside by detaching the drain bolt 92. The lower wall 83 is further provided with a second right-left communication passage SP which passes therethrough in the vehicle width direction to intersect the drain passage 90 and through which the left reservoir RL and the right reservoir RR are communicated with each other. Accordingly, the second right-left communication passage SP is provided in parallel with the first right-left communication passage FP defined by the strainer containing chamber 86.

Note that when the outer peripheral surfaces of the first and second cylindrical walls 43 and 44 and the right-left partition wall 45 are continuous with the bottom 84 with no wall 83 interposed therebetween in the strainer containing chamber 86, the drain passage 90 is provided in a border region between the outer peripheral surfaces and the bottom 84, and the second right-left communication passage SP is also provided in this border region.

Figure 6:
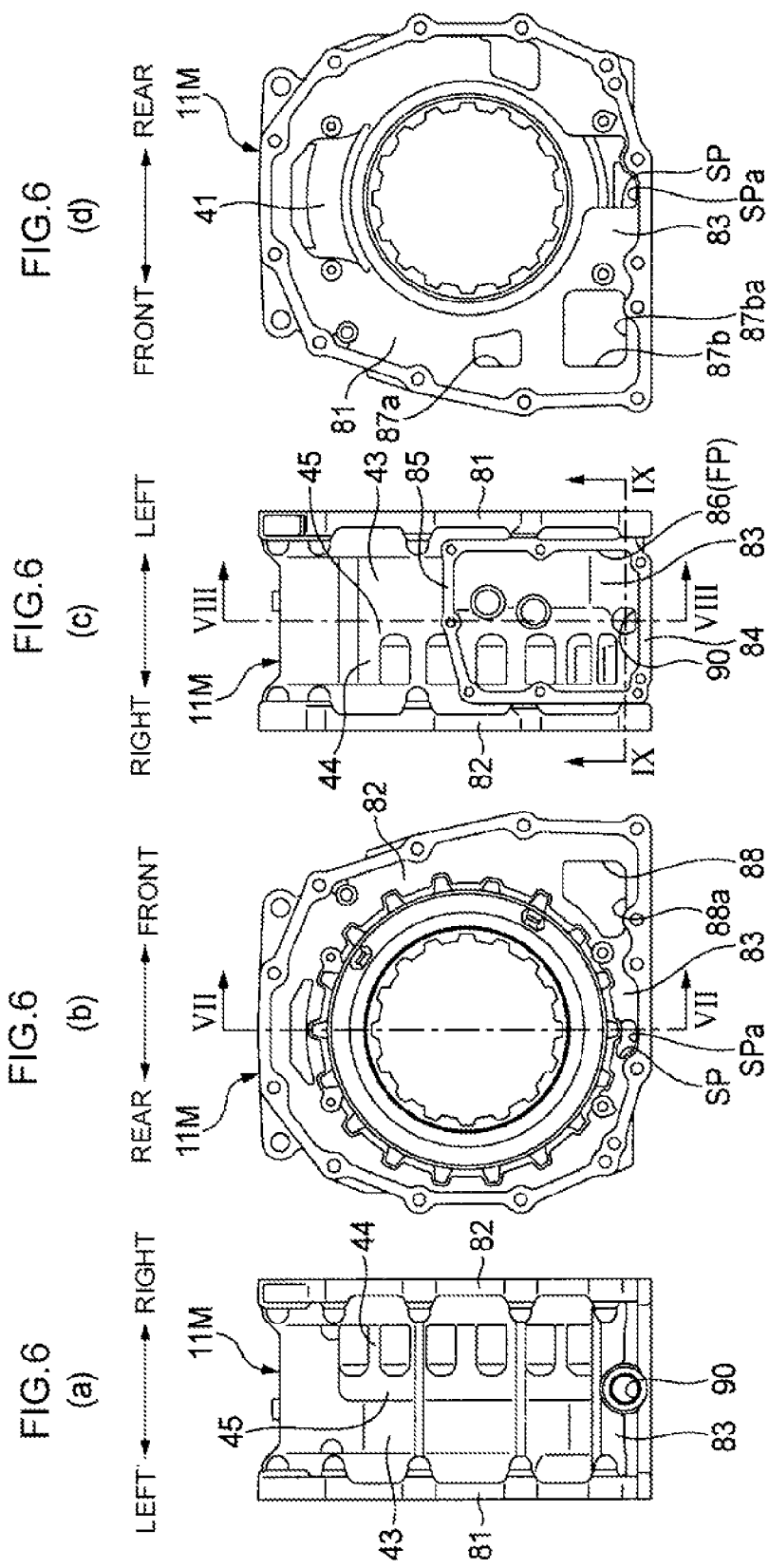
FIG. 6(*a*) is a rear view of the center case.
Figure 7:
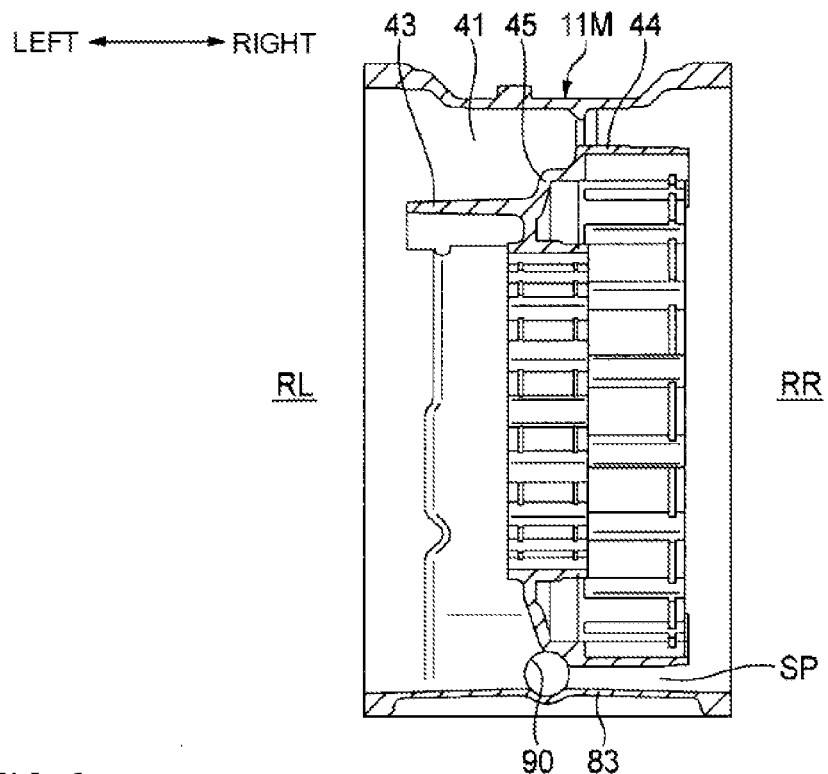
FIG. 7 is a cross-sectional view taken along the line VII-VII of FIG. 6(*b*).
Figure 8:
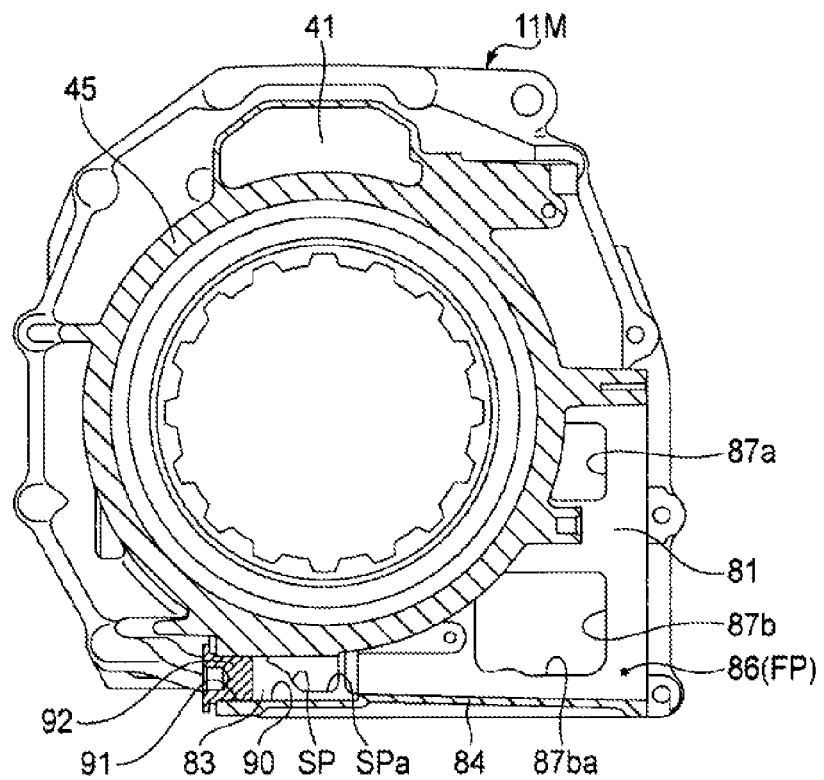
FIG. 8 is a cross-sectional view taken along the line VIII-VIII of FIG. 6(*c*).
Figure 9:
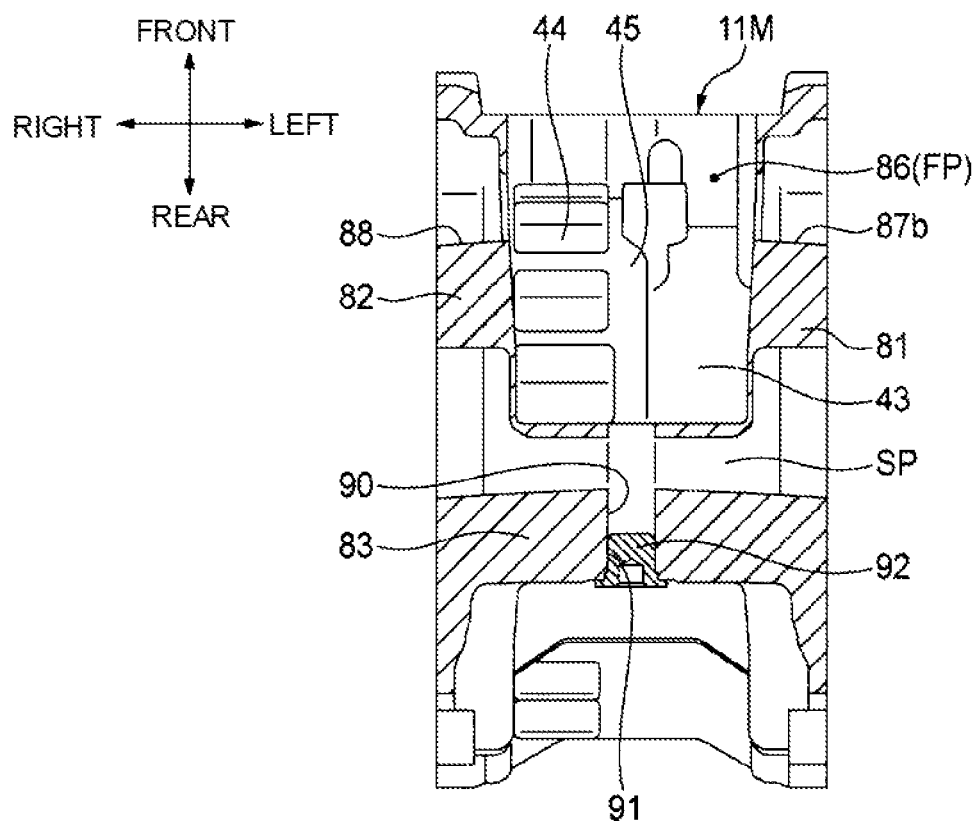
FIG. 9 is a cross-sectional view taken along the line IX-IX of FIG. 6(*c*).

As illustrated in FIG. 6, a bottom SPa of the second right-left communication passage SP is provided lower than a bottom 87ba of the through hole 87b serving as the left middle communication passage and a bottom 88a of the through hole 88 serving as the right middle communication passage. Thus, oil unable to flow beyond the two through holes 87b and 88 can be discharged through the second right-left communication passage SP. Note that as illustrated in FIG. 6(d) and FIG. 7, the second right-left communication passage SP is formed by providing, at a circumferential position thereof a large cut-out extending from the drain passage 90 to the left projected portion 81.

As described thus far, in the rear wheel driving apparatus 1 according to the present embodiment, the first and second right-left communication passages FP and SP, which are provided in parallel with each other and through which the left reservoir RL and the right reservoir RR are communicated with each other, enhance flowability of oil in the left reservoir RL and the right reservoir RR, thus enabling smoothing of an oil level. Also when an obstruction is placed in one of the right-left communication passages FP and SP beforehand or when foreign matter has intruded into one of the right-left communication passages FP and SP afterward, the flowability of oil in the left reservoir RL and the right reservoir RR can be ensured by the other one of the right-left communication passages FP and SP.

The second right-left communication passage SP intersects and communicates with the drain passage 90 through which the drainage port 91 and the first right-left communication passage FP are communicated with each other; therefore, in addition to the first right-left communication passage FP, a path leading to the drainage port 91 from the second right-left communication passage SP is also provided, thus improving drainage ability. In particular, a distance of the second right-left communication passage SP to the drainage port 91 is short, and therefore, drainage ability can be further improved.

The first right-left communication passage FP includes the strainer containing chamber 86 in which the suction port of the strainer 71 used for supply of oil is disposed. The left reservoir RR and the strainer containing chamber 86 are communicated with each other via the through holes 87a and 87b, and the right reservoir RL and the strainer containing chamber 86 are communicated with each other via the through hole 88. Thus, the suction port of the strainer 71 is disposed in the first right-left communication passage FP in which a liquid level is stable compared with that in the left reservoir RR and the right reservoir RL, and therefore, oil can be reliably supplied to the strainer 71 and the oil pump 70; furthermore, the amount of air sucked into the strainer 71 and the oil pump 70 can be reduced. Since the strainer containing chamber 86 is defined in the first right-left communication passage FP, the amount of suction air can be further reduced.

Since the bottom SPa of the second right-left communication passage SP is located lower than the bottom 87ba of the through hole 87b and the bottom 88a of the through hole 88, oil unable to flow beyond the through holes 87b and 88 can be discharged through the second right-left communication passage SP.

Second Embodiment

Next, a rear wheel driving apparatus according to a second embodiment of the present invention will be described with reference to FIGS. 10 and 11. Note that elements identical or equivalent to those in the first embodiment are identified with the same reference characters, and description thereof will be omitted or simplified.

Figure 10:
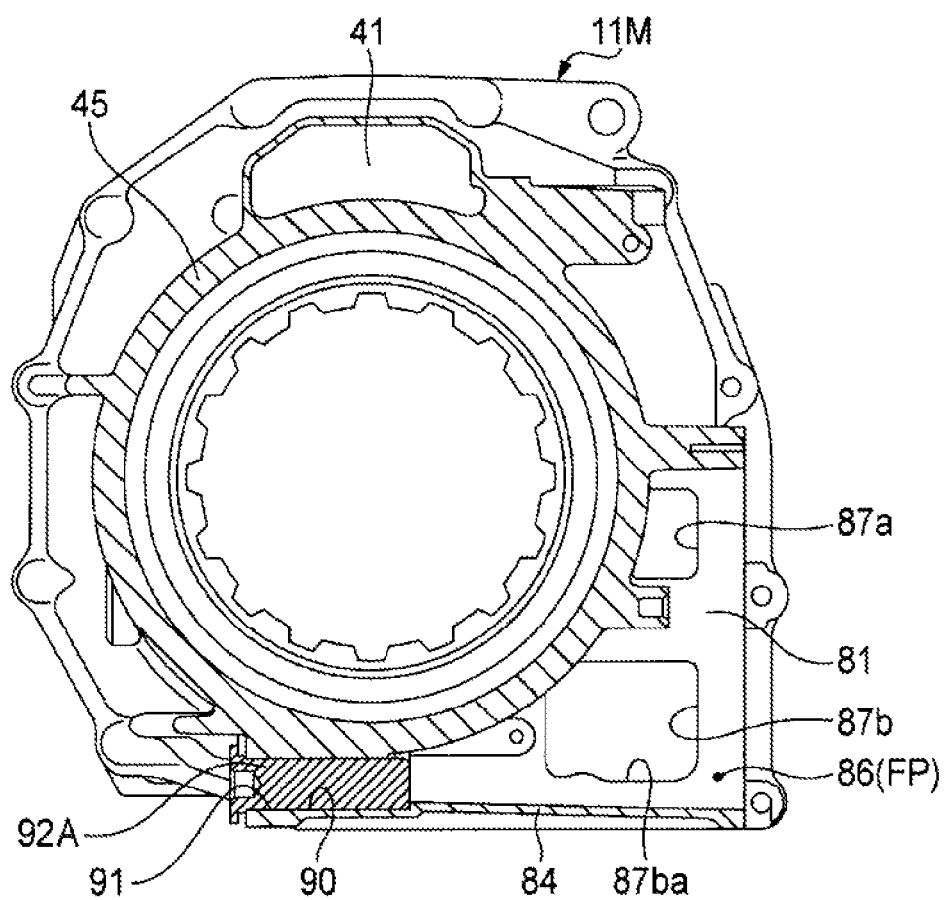
FIG. 10 is a cross-sectional view which illustrates how a discharge port is closed by a drain bolt in a vehicle driving apparatus according to a second embodiment of the present invention, and which is equivalent to FIG. 8.
Figure 11:
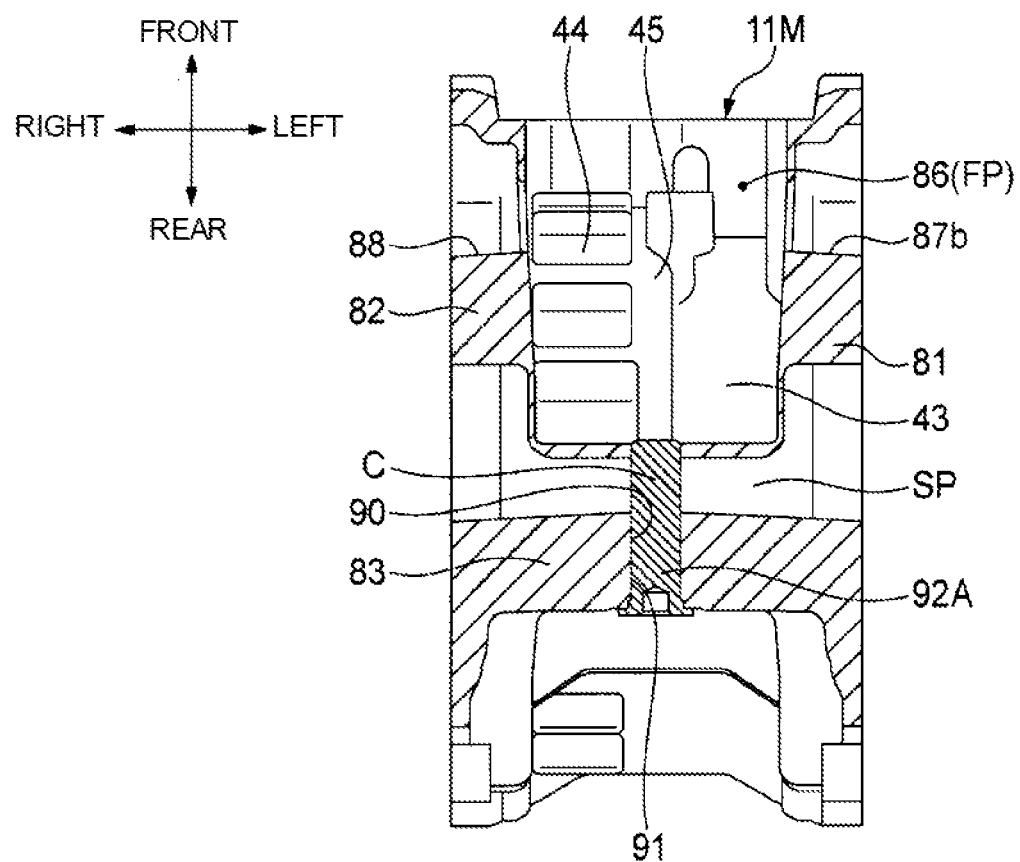
FIG. 11 is a cross-sectional view which illustrates how the discharge port is closed by the drain bolt in the vehicle driving apparatus of FIG. 10, and which is equivalent to FIG. 9.

In the present embodiment, as illustrated in FIGS. 10 and 11, with the drainage port 91 of the drain passage 90 closed by a drain bolt 92A, the drain bolt 92A is so long as to protrude into the second right-left communication passage SP via the drain passage 90. In particular, with the drainage port 91 of the drain passage 90 closed by the drain bolt 92A, the drain bolt 92A is so long as to close an entire intersection region C where the drain bolt 92A intersects the second right-left communication passage SP via the drain passage 90, and a tip of the drain bolt 92A is extended through the drain passage 90 beyond the intersection region C. Accordingly, with the drainage port 91 of the drain passage 90 closed by the drain bolt 92A during running of the vehicle, for example, the second right-left communication passage SP is completely closed, thus suppressing the flowability of oil in the left reservoir RL and the right reservoir RR through the second right-left communication passage SP.

In the rear wheel driving apparatus 1 according to the present embodiment, with the drainage port 91 closed by the drain bolt 92A, the drain bolt 92A is so long as to protrude into the second right-left communication passage SP via the drain passage 90. Therefore, the second right-left communication passage SP can be at least partially closed, and the flowability of oil stored in the case 11 can be reduced, for example, when the vehicle makes a turn which exerts centrifugal force, so that a flow of the oil toward one side in the case 11 can be suppressed. Accordingly, it is possible to achieve both of favorable drainage upon removal of the drain bolt 92A, and reduction in oil flowability upon insertion of the drain bolt 92A. In particular, the communication of the drain passage 90 with the second right-left communication passage SP allows oil to be favorably discharged from the left reservoir RL and the right reservoir RR through the single drain passage 90.

When the second right-left communication passage SP intersects and communicates with the drain passage 90 and the drainage port 91 is closed by the drain bolt 92A, the drain bolt 92A is so long as to close the entire intersection region C where the drain bolt 92A intersects the second right-left communication passage SP via the drain passage 90, and therefore, the flowability of oil stored in the case 11 can be further reduced.

Moreover, since the strainer 71 is disposed in the strainer containing chamber 86 as described in the above embodiment, the strainer 71 serves as an obstruction to enable a reduction in flowability of oil in the first right-left communication passage FP, thus making it possible to suppress the flow of oil toward one side in the case 11. Compared with a case where the strainer 71 is disposed outside of the strainer containing chamber 86, the rear wheel driving apparatus 1 can be reduced in size.

Other features and effects of the present embodiment are similar to those of the first embodiment.

A plug member according to the present invention is not limited to a plug member such as the drain bolt 92A according to the present embodiment which is so long as to close the entire intersection region C where the drain bolt 92A intersects the second right-left communication passage SP via the drain passage 90, with the drainage port 91 closed by the drain bolt 92A. In other words, the plug member according to the present invention may be any plug member as long as the plug member is so long as to protrude into the second right-left communication passage SP via the drain passage 90 and closes at least part of the second right-left communication passage SP, with the drainage port 91 closed by the drain bolt 92A.

Third Embodiment

Figure 13:
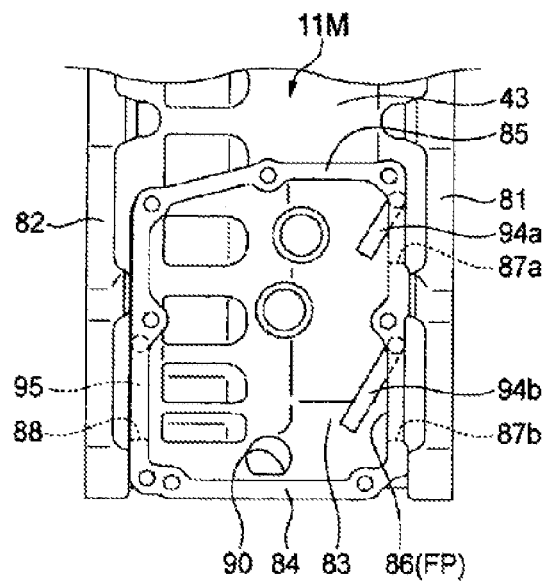
FIG. 13(*a*) is a diagram illustrating the rear wheel driving apparatus of FIG. 12, in which first and second inner doors are opened/closed when a vehicle makes a left turn.
Figure 13:
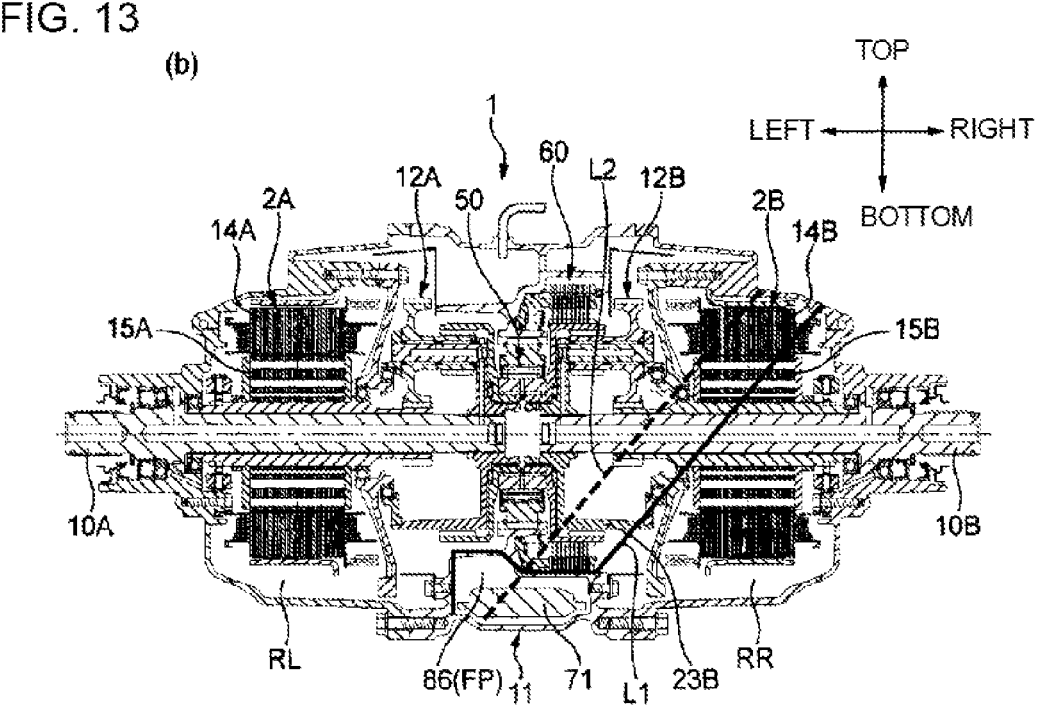

Next, a rear wheel driving apparatus according to a third embodiment of the present invention will be described with reference to FIGS. 12 and 13. Note that elements identical or equivalent to those in the first embodiment are identified with the same reference characters, and description thereof will be omitted or simplified.

In the present embodiment, as illustrated in FIG. 12, the through holes 87a and 87b serving as the left middle communication passage are provided with first inner doors 94a and 94b serving as first one-way flow suppressing means, and the through hole 88 serving as the right middle communication passage is provided with a second inner door 95 serving as a second one-way flow suppressing means. The first inner doors 94a and 94b are attached to the through holes 87a and 87b so as to open and close inside the strainer containing chamber 86 by using upper regions of the through holes 87a and 87b as supporting points. When oil tries to flow toward the left reservoir RL from the strainer containing chamber 86, the first inner doors 94a and 94b close the through holes 87a and 87b to suppress the flow of oil to the left reservoir RL from the strainer containing chamber 86. When oil tries to flow toward the strainer containing chamber 86 from the left reservoir RL, the first inner doors 94a and 94b open the through holes 87a and 87b to allow the flow of oil to the strainer containing chamber 86 from the left reservoir RL. The second inner door 95 is also attached to the through hole 88 so as to open and close inside the strainer containing chamber 86 by using an upper region of the through hole 88 as a supporting point. When oil tries to flow toward the right reservoir RR from the strainer containing chamber 86, the second inner door 95 closes the through hole 88 to suppress the flow of oil to the right reservoir RR from the strainer containing chamber 86. When oil tries to flow toward the strainer containing chamber 86 from the right reservoir RR, the second inner door 95 opens the through hole 88 to allow the flow of oil to the strainer containing chamber 86 from the right reservoir RR.

Accordingly, when the vehicle makes a left turn, oil tries to flow toward the right reservoir RR from the left reservoir RL via the strainer containing chamber 86. In this case, the first inner doors 94a and 94b open inwardly so that oil flows into the strainer containing chamber 86 from the left reservoir RL via the through holes 87a and 87b, while the second inner door 95 closes the through hole 88 to suppress an outflow of oil to the right reservoir RR from the strainer containing chamber 86. Thus, the amount of oil stored in the strainer containing chamber 86 is increased, and as illustrated in FIG. 13(b), a fluid level L1 of the right reservoir RR according to the present embodiment is lower than a fluid level L2 obtained when the first inner doors 94a and 94b and the second inner door 95 are not attached hence, the flow of oil toward one side can be suppressed. As a result, oil agitation resistance that occurs during rotation of the rotor 15B of the second electric motor 2B can be reduced. When the fluid level L2 is obtained, a lower portion of the planetary carrier 23B of the second planetary gear type speed reducer 12B is submerged, but when the fluid level L1 is obtained, substantially the entire planetary carrier 23B is above the fluid level, thus making it possible to reduce oil agitation resistance that occurs during rotation of the planetary carrier 23B. Moreover, since oil is stored in the strainer containing chamber 86, oil can be reliably supplied to the strainer 71 and the oil pump 70, and suction of air into the strainer 71 and the oil pinup 70 can be suppressed.

When the vehicle makes a right turn, the second inner door 95 opens inwardly, and the first inner doors 94a and 94b close the through hole 88; therefore, oil flows into the strainer containing chamber 86 from the right reservoir RR, while an outflow of oil to the left reservoir RL from the strainer containing chamber 86 is suppressed. Accordingly, the amount of oil stored in the strainer containing chamber 86 can be increased, and the fluid level of the left reservoir RL can be reduced in accordance with the amount of oil stored in the strainer containing chamber 86, thus making it possible to suppress the flow of oil toward one side in the case 11.

Other features and effects of the present embodiment are similar to those of the first embodiment.

Note that the present invention is not limited to the embodiments described above, and changes, modifications, etc. may be made as appropriate.

Output shafts of the electric motors 2A and 2B and the axles 10A and 10B do not have to be disposed coaxially.

The front wheel driving apparatus 6 may use the electric motor 5 as a single driving source without using the internal combustion engine 4.

In the present embodiment, the left lateral case 11A and the center case 11M constitute the first case 11L, and the right lateral case 11B and the center case 11M constitute the second case 11R. However, the first case 11L and the second case 11R according to the present invention are not limited to these structures so long as the first case 11L contains the first electric motor 2A and the first planetary gear type speed reducer 12A and includes the left reservoir RL, and the second case 11R contains the second electric motor 2B and the second planetary gear type speed reducer 12B and includes the right reservoir RR.

Further, even when the rear wheel driving apparatus 1 according to the first embodiment is adapted so that the first and second planetary gear type speed reducers 12A and 12B are not provided, the effects of the embodiment can be achieved. Specifically, a rear wheel driving apparatus according to the present invention may be adapted to include: a first electric motor for driving a left wheel; a first case that contains the first electric motor and includes a left reservoir for storing a liquid fluid for lubrication and/or cooling of the first electric motor, a second electric motor for driving a right wheel; a second case that contains the second electric motor and includes a right reservoir for storing a liquid fluid for lubrication and/or cooling of the second electric motor a first right-left communication passage through which the right reservoir and the left reservoir are communicated with each other; and a second right-left communication passage which is provided in parallel with the first right-left communication passage and through which the right reservoir and the left reservoir are communicated with each other.

Furthermore, the rear wheel driving apparatus 1 according to the second embodiment may be adapted so that the first right-left communication passage FP is not provided, and in addition, the effects of the second embodiment can be achieved even when the rear wheel driving apparatus 1 is adapted so that the first and second planetary gear type speed reducers 12A and 12B are not provided. Specifically, a rear wheel driving apparatus according to the present invention may be adapted to include: a first electric motor for driving a left wheel; a first case that contains the first electric motor and includes a left reservoir for storing a liquid fluid for lubrication and/or cooling of the first electric motor; a second electric motor for driving a right wheel; a second case that contains the second electric motor and includes a right reservoir for storing a liquid fluid for lubrication and/or cooling of the second electric motor; a right-left communication passage through which the right reservoir and the left reservoir are communicated with each other; a drainage passage that communicates with the right-left communication passage and includes a drainage port through which the liquid fluid is discharged to outside; and a plug member for closing the drainage port, wherein the plug member is so long as to protrude into the right-left communication passage via the drainage passage, with the drainage port closed by the plug member.

The rear wheel driving apparatus 1 according to the second embodiment may be adapted so that the first electric motor 2A is not contained in the first case 11L and the second electric motor 2B is not contained in the second case 11R. In that case, a first driving source for driving the left wheel and a second driving source for driving the right wheel are not limited to the first and second electric motors 2A and 2B, but other driving sources such as internal combustion engines may be used. Specifically, a rear wheel driving apparatus according to the present invention may be adapted to include: a first driving source for driving a left wheel; a first speed changer provided on a power transmission path between the first driving source and the left wheel; a first case that contains the first speed changer and includes a left reservoir for storing a liquid fluid for lubrication of the first speed changer; a second driving source for driving a right wheel; a second speed changer provided on a power transmission path between the second driving source and the right wheel; a second case that contains the second speed changer and includes a right reservoir for storing a liquid fluid for lubrication of the second speed changer; a right-left communication passage through which the right reservoir and the left reservoir are communicated with each other; a drainage passage that communicates with the right-left communication passage and includes a drainage port through which the liquid fluid is discharged to outside; and a plug member for closing the drainage port, wherein the plug member is so long as to protrude into the right-left communication passage via the drainage passage, with the drainage port closed by the plug member.

The first and second one-way flow suppressing means according to the present invention are not limited to the first and second inner doors according to the third embodiment. Alternatively, the one-way flow suppressing means may be any means as long as it suppresses the flow of the liquid fluid to the right reservoir or the left reservoir from the center volume chamber and allows the flow of the liquid fluid to the center volume chamber from the right reservoir or the left reservoir.

Besides, the first and second one-way flow suppressing means according to the third embodiment are also usable in a vehicle driving apparatus having no second right-left communication passage SP such as one described in the first embodiment. Specifically, a rear wheel driving apparatus according to the present invention may be adapted to include: a first electric motor for driving a left wheel; a first case that contains the first electric motor and includes a left reservoir for storing a liquid fluid for lubrication and/or cooling of the first electric motor; a second electric motor for driving a right wheel; a second case that contains the second electric motor and includes a right reservoir for storing a liquid fluid for lubrication and/or cooling of the second electric motor; and a right-left communication passage which includes a center volume chamber provided with a suction port of a liquid fluid supply device used for supply of the liquid fluid and through which the right reservoir and the left reservoir are communicated with each other, wherein the left reservoir and the center volume chamber are communicated with each other via a left middle communication passage, wherein the right reservoir and the center volume chamber are communicated with each other via a right middle communication passage, wherein the left middle communication passage is provided with a first one-way flow suppressing means that suppresses a flow of the liquid fluid to the left reservoir from the center volume chamber and allows the liquid fluid to flow to the center volume chamber from the left reservoir, and wherein the right middle communication passage is provided with a second one-way flow suppressing means that suppresses a flow of the liquid fluid to the right reservoir from the center volume chamber and allows the liquid fluid to flow to the center volume chamber from the right reservoir.

Note that the present invention is based on Japanese Patent Application No. 2011-84621 filed on Apr. 6, 2011, and Japanese Patent Application No. 2011-89247 filed on Apr. 13, 2011, the contents of which are hereby incorporated by reference.

DESCRIPTION OF REFERENCE CHARACTERS 1 rear wheel driving apparatus (vehicle driving apparatus)
2A first electric motor
2B second electric motor
11 case
12A first planetary gear type speed reducer (first speed changer)
12B second planetary gear type speed reducer (second speed changer)
21A, 21B sun gear (second rotation element)
22A, 22B planetary gear (double pinion)
23A, 23B planetary carrier (carrier, third rotation element)
24A, 24B ring gear (first rotation element)
26A, 26B first pinion (large-diameter pinion)
27A, 27B second pinion (small-diameter pinion) fixation plate
36 rotation plate
49 external communication passage
50 one-way clutch (one-way power transmission means)
60 hydraulic brake (engagement/disengagement means)
87a, 87b through hole (left middle communication passage)
88 through hole (right middle communication passage)
90 drain passage (drainage passage)
91 drainage port
92, 92A drain bolt (plug member)
94a, 94b first inner door (first one-way flow suppressing means)
95 second inner door (second one-way flow suppressing means)
FP first right-left communication passage
LWr left rear wheel (left wheel)
RWr right rear wheel (right wheel)
RL left reservoir
RR right reservoir
SP second right-left communication passage

The invention claimed is:

1. A vehicle driving apparatus comprising:
a first electric motor for driving a left wheel;
a first case that houses the first electric motor and includes a left reservoir for storing a liquid fluid for lubrication and/or cooling of the first electric motor;
a second electric motor for driving a right wheel;
a second case that houses the second electric motor and includes a right reservoir for storing a liquid fluid for lubrication and/or cooling of the second electric motor;
a first right-left communication passage through which the right reservoir and the left reservoir are communicated with each other; and
a second right-left communication passage which is provided in parallel with the first right-left communication passage and through which the right reservoir and the left reservoir are communicated with each other.

2. The vehicle driving apparatus of claim 1, further comprising:
a drainage passage through which the first right-left communication passage and a drainage port for discharging the liquid fluid to outside are communicated with each other, wherein the second right-left communication passage intersects and communicates with the drainage passage.

3. The vehicle driving apparatus of claim 1,
wherein the first right-left communication passage includes a center volume chamber provided with a suction port of a liquid fluid supply device for supplying the liquid fluid,
wherein the left reservoir and the center volume chamber are communicated with each other via a left middle communication passage, and
wherein the right reservoir and the center volume chamber are communicated with each other via a right middle communication passage.

4. The vehicle driving apparatus of claim 3,
wherein a bottom of the second right-left communication passage is located lower than at least one of a bottom of the left middle communication passage and a bottom of the right middle communication passage.

5. The vehicle driving apparatus of claim 1, thither comprising:
a drainage passage that is communicated with the second right-left communication passage and includes a drainage port through which the liquid fluid is discharged to outside; and
a plug member for closing the drainage port, wherein the plug member is so long as to protrude into the second right-left communication passage via the drainage passage, with the drainage port closed by the plug member.

6. The vehicle driving apparatus of claim 5,
wherein the second right-left communication passage intersects and communicates with the drainage passage, and
wherein the plug member is so long as to close an entire intersection region where the plug member intersects the second right-left communication passage via the drainage passage, with the drainage port closed by the plug member.

7. The vehicle driving apparatus of claim 5,
wherein the first right-left communication passage includes a center volume chamber provided with a suction port of a liquid fluid supply device used for supply of the liquid fluid,
wherein the left reservoir and the center volume chamber are communicated with each other via a left middle communication passage, and
wherein the right reservoir and the center volume chamber are communicated with each other via a right middle communication passage.

8. The vehicle driving apparatus of claim 7,
wherein a strainer for filtering the liquid fluid sucked through the suction port is disposed in the center volume chamber.

9. The vehicle driving apparatus of claim 7,
wherein the left middle communication passage is provided with a first one-way flow suppressing means that suppresses a flow of the liquid fluid to the left reservoir front the center volume chamber and allows the liquid fluid to flow to the center volume chamber from the left reservoir, and
wherein the right middle communication passage is provided with a second one-way flow suppressing means that suppresses a flow of the liquid fluid to the right reservoir from the center volume chamber and allows a flow of the liquid fluid to the center volume chamber from the right reservoir.

10. A vehicle driving apparatus comprising:
a first electric motor for driving a left wheel;
a first speed Changer provided on a power transmission path between the first electric motor and the left wheel;
a first case that houses the first electric motor and the first speed changer, and includes a left reservoir for storing a liquid fluid for lubrication and/or cooling of at least one of the first electric motor and the power transmission path;
a second electric motor for driving a right wheel;
a second speed changer provided on a power transmission path between the second electric motor and the right wheel;
a second case that houses the second electric motor and the second speed changer, and includes a right reservoir for storing a liquid fluid for lubrication and/or cooling of at least one of the second electric motor and the power transmission path;
a first right-left communication passage through which the right reservoir and the left reservoir are communicated with each other; and
a second right-left communication passage which is provided in parallel with the first right-left communication passage and through which the right reservoir and the left reservoir are communicated with each other.

11. The vehicle driving apparatus of claim 10, further comprising:
a drainage passage through which the first right-left communication passage and a drainage port for discharging the liquid fluid to outside are communicated with each other, wherein the second right-left communication passage intersects and communicates with the drainage passage.

12. The vehicle driving apparatus of claim 10,
wherein the first right-left communication passage includes a center volume chamber provided with a suction port of a liquid fluid supply device for supplying the liquid fluid,
wherein the left reservoir and the center volume chamber are communicated with each other via a left middle communication passage, and
wherein the right reservoir and the center volume chamber are communicated with each other via a right middle communication passage.

13. The vehicle driving apparatus of claim 12,
wherein a bottom of the second right-left communication passage is located lower than at least one of a bottom of the left middle communication passage and a bottom of the right middle communication passage.

14. The vehicle driving apparatus of claim 10, further comprising:
a drainage passage that is communicated with the second right-left communication passage and includes a drainage port through which the liquid fluid is discharged to outside; and
a plug member for closing the drainage port, wherein the plug member is so long as to protrude into the second right-left communication passage via the drainage passage, with the drainage port closed by the plug member.

15. The vehicle driving apparatus of claim 14,
wherein the second right-left communication passage intersects and communicates with the drainage passage, and
wherein the plug member is so long as to close an entire intersection region where the plug member intersects the second right-left communication passage via the drainage passage, with the drainage port closed by the plug member.

16. The vehicle driving apparatus of claim 14,
wherein the first right-left communication passage includes a center volume chamber provided with a suction port of a liquid fluid supply device for supplying the liquid fluid,
wherein the left reservoir and the center volume chamber are communicated with each other via a left middle communication passage, and
wherein the right reservoir and the center volume chamber are communicated with each other via a right middle communication passage.

17. The vehicle driving apparatus of claim 16, wherein a strainer for filtering the liquid fluid sucked through the suction port is disposed in the center volume chamber.

18. The vehicle driving apparatus of claim 6,
wherein the left middle communication passage is provided with a first one-way flow suppressing means that suppresses a flow of the liquid fluid to the left reservoir from the center volume chamber and allows the liquid fluid to flow to the center volume chamber from the left reservoir, and
wherein the right middle communication passage is provided with a second one-way flow suppressing means that suppresses a flow of the liquid fluid to the right reservoir from the center volume chamber and allows the liquid fluid to flow to the center volume chamber from the right reservoir.

* * * * *